A. TURNER AND H. A. RIPLEY.
CRANBERRY PICKING APPARATUS.
APPLICATION FILED AUG. 2, 1918. RENEWED AUG. 24, 1920.
1,360,473.
Patented Nov. 30, 1920.
2 SHEETS—SHEET 1.
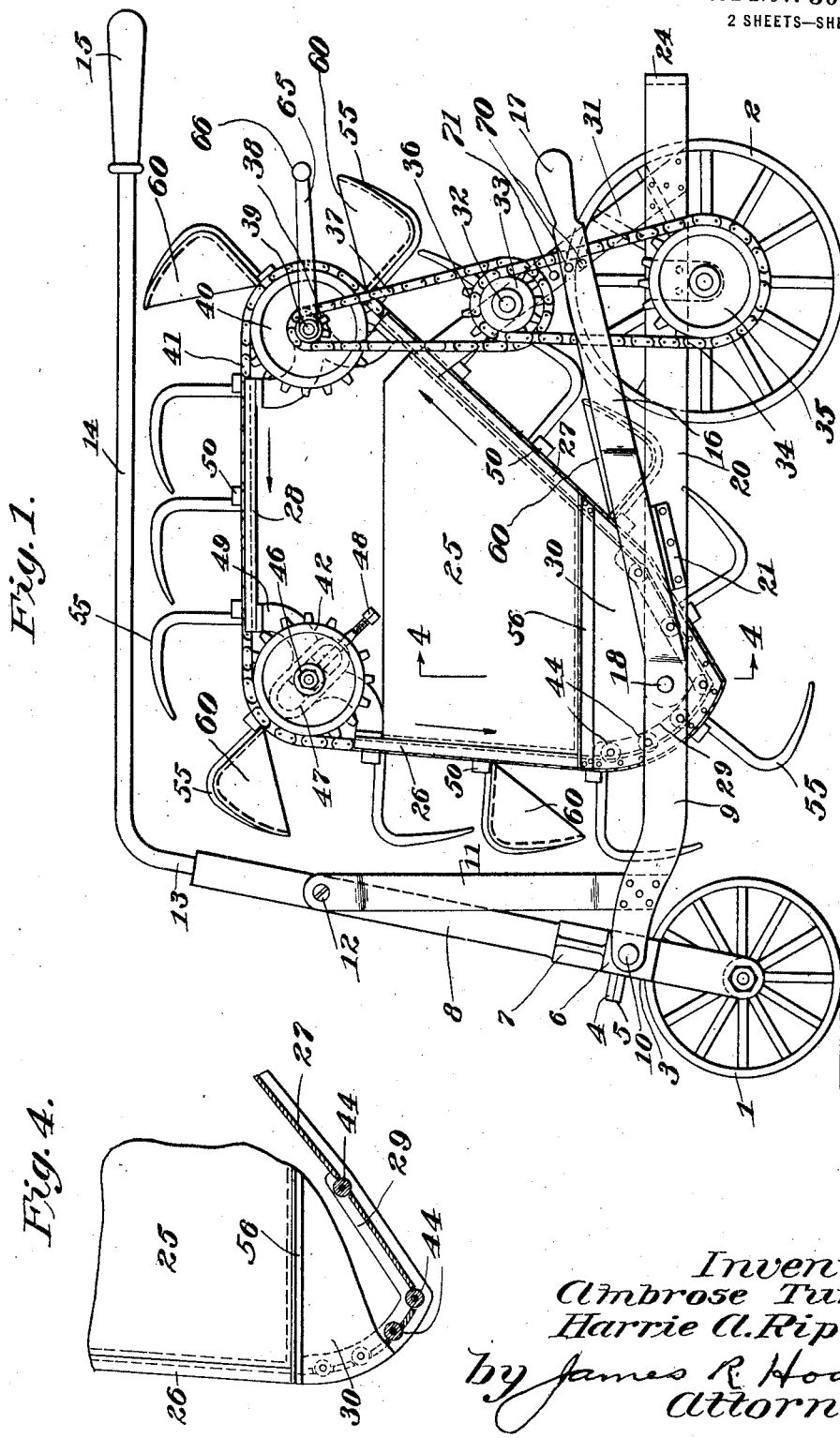
Inventors
Ambrose Turner
Harrie A. Ripley
by James R. Hodder
Attorney

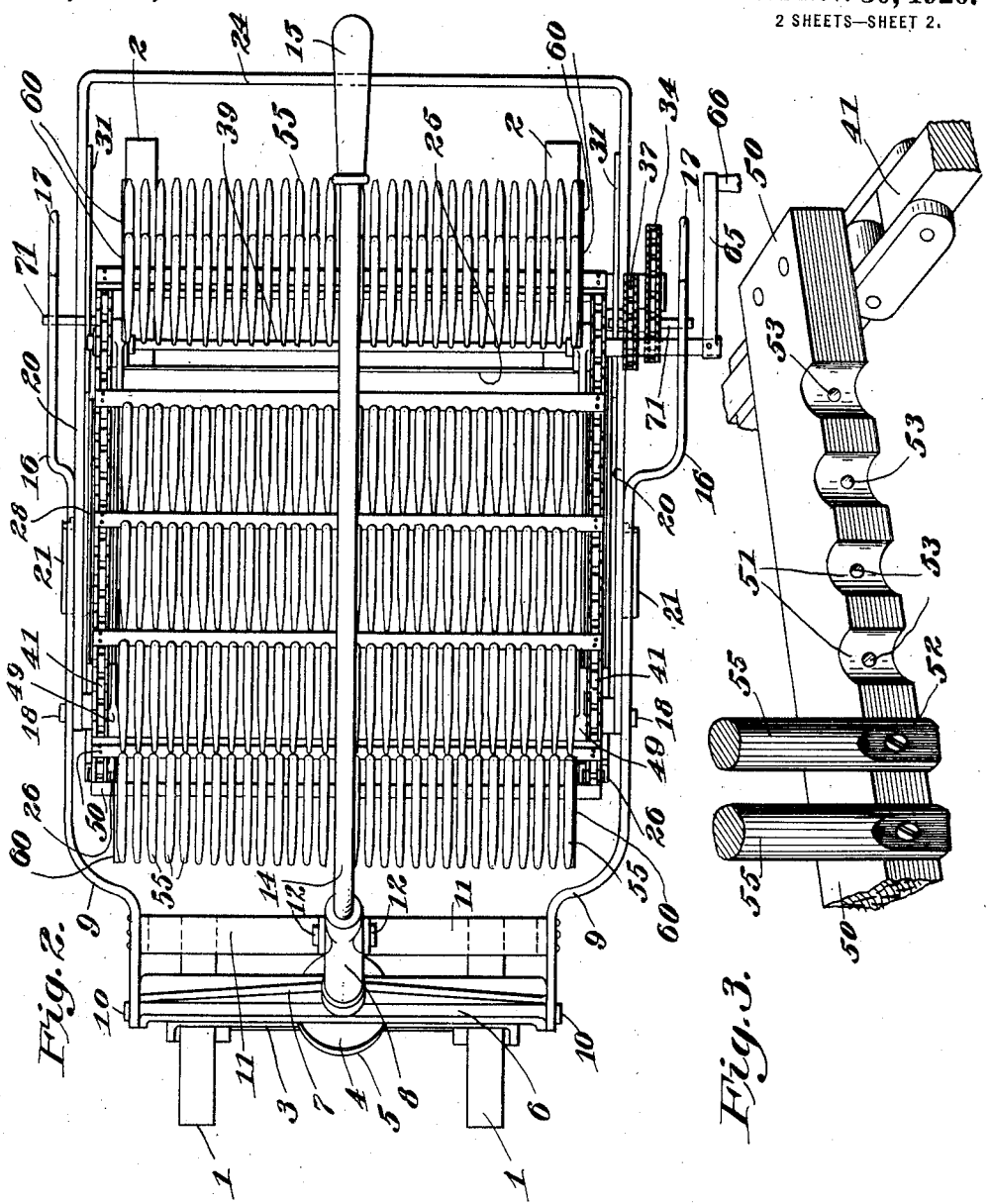

UNITED STATES PATENT OFFICE.

AMBROSE TURNER AND HARRIE A. RIPLEY, OF WAREHAM, MASSACHUSETTS, ASSIGNORS OF ONE-THIRD TO EDWARD V. HOPKINS, OF WAREHAM, MASSACHUSETTS.

CRANBERRY-PICKING APPARATUS.

1,360,473. Specification of Letters Patent. Patented Nov. 30, 1920.

Application filed August 2, 1918, Serial No. 248,019. Renewed August 24, 1920. Serial No. 405,737.

*To all whom it may concern:*

Be it known that we, AMBROSE TURNER and HARRIE A. RIPLEY, residents of Wareham, Mass., have invented an Improvement in Cranberry-Picking Apparatus, of which the following description, in connection with the accompanying drawings, is a specification, like letters on the drawings representing like parts.

Our present invention is an improved apparatus for picking, dumping and carrying berries from plants, such as cranberries.

In this type of apparatus it is most important to provide mechanism which will carefully engage and efficiently remove the cranberries without injury to either the berries or to the plants, therefore it is an important feature of the present invention to provide an apparatus which may be operated through a cranberry bog capable of steering and manipulation through the bushes, plants, and branches, and gathering in the berries while the apparatus is moved forwardly, carrying the gathered berries upwardly and into a receptacle to receive the same and acting as a means to assist and propel the apparatus. Other important features of the invention, novel combinations and advantages will be herein more fully described and explained.

Referring to the drawings, illustrating a preferred embodiment—

Figure 1 is a side view partly in cross section of our improved apparatus;

Fig. 2 is a top view;

Fig. 3 is an enlarged detail;

Fig. 4 illustrates a usual type of chain tightening device.

As shown in the drawings our improved apparatus comprises a pair of front wheels 1, rear wheels 2, 2 and a framework, the latter consisting in a forward forked member 3 mounted on the front wheels rotatively secured for steering, to a pair of bearing plates 4 and 5, the lower one on the frame 3 and the upper plate 4 on the cross frame 6 on which a central hub 7 is secured, carrying a hollow post 8. Side frames 9, 9 are secured at each end of the frame 6 by bolts 10, 10 and also a bracing member 11, 11 extends from each side of the frames 9 upwardly to the hollow post 8 being secured thereto at 12, 12. In the post 8 and connected with the lower frame 3, is a rod 13 adapted to turn the frame 3, and steering wheels 1, 1, said rod being bent backwardly as shown at 14 and terminating at a handle 15 within convenient reach at the rear of the apparatus. The side frames 9, 9 also extend rearwardly as shown at 16, 16 (see Fig. 2) terminating at handle 17, 17 preferably being inclined upwardly, also within convenient reach of the operator. Pivoted to the frames 9, 9 at 18 are the rear frames 20, 20 extending over and having bearings for each wheel 2, 2, each frame having a rest 21 bolted to the side and adapted to act as a stop on which the portions 9 of the front frames may rest. This construction affords a toggle or "knuckle joint" so that upon lifting the handle 17 the entire apparatus will be raised as the rear wheels and front wheels will be brought closer together, thus lifting the berry-picking fingers upwardly whenever desired. This construction affords a quick, economical and efficient means to regulate the height of the berry-picking fingers during the operation of the apparatus.

The operating portion of the apparatus will now be described, being secured to the side frames 9 and 16 and therefore being capable of raising or lifting relatively with the surface of the ground, upon raising the handle 17 as just described. This apparatus comprises the substantially triangular boxlike framework including the central berry-receiving receptacle or box 25 and side frames 26, 27, 28 and 29, the latter being formed with sides 30 in the form of a triangular or cam-shaped member pivoted to the frame at 18. Supporting braces 31 at each side from the frame downwardly to the side members 20 pivoted thereto near the cross bar 24 uniting said members 20, hold the apparatus in proper position. Mounted on the rear braces 31 to an axle 32 is a sprocket wheel 33 at one side from which the driving chain 34 is led to a corresponding sprocket wheel 35 on the rear wheel 2 and from said axle 32, a second sprocket wheel 36 is keyed thereto and a chain 37 to the wheel 38 on a shaft 39 rotates the upper sprockets 40 on each side of the apparatus. This affords driving power for the chains 41, 41 around the triangular framework, consisting in the wheels 40, as described, and 42, 42 at the forward portion of the framework and over the triangular cam-like lower frame portion 29. Preferably these driving chains 41 are led in suitable guideways in the frames 26, 27, 28 and 29, with a series of rollers as shown at 44 to reduce friction, prticularly at the forward part of said cam-like lower frame.

The forward pair of upper idlers or sprocket wheels 42 are preferably mounted in sliding journal-boxes 46 in a slide 47 with an adjustable bolt 48, this construction being usual to afford an adjustable tension on the chains 41 and being carried on angular braces 49 uniting the side frames 26 and 28 (see Fig. 1).

The chains 41 are shown herein conventionally formed and may be of any suitable type with a set of links which will carry cross bars 50, illustrated in enlarged detail in Fig. 3. These cross bars span the width of the apparatus at appropriate intervals, aiding in holding the chains 41, 41 spaced and in alinement over the sprocket wheels 40 and 42 and the cam 29. To these cross bars 50 are secured the berry-picking fingers 55 by any suitable means, preferably through grooves 51, spaced on the cross bar 50 and by screws 52 passing through the fingers 55 and into corresponding tapped recess 53, as clearly shown in Fig. 3. We prefer to form these berry-picking fingers 55 substantially as shown in Fig. 1 and to space the same so that while traversing the frames 27 in the upward or berry-carrying movement of the apparatus, as shown at the right of Fig. 1, they will be substantially close against the shanks of the adjacent fingers 55. We also form the cam 29 of such shape that, as the bar 50 with its set of fingers 55 passes thereover, the fingers will be given a rearwardly and upwardly pulling action, being instantly shifted from the position of the picking fingers as illustrated on the forward part of the cam 29 passing over the rolls 44 of the rearward portion of the cam, substantially in alinement with the frame 27. This rearwardly and upwardly pulling position prevents the berries from falling down from the apparatus, insures the most efficient pulling with least injury to the bushes and also enables the greatest possible holding capacity for each set of fingers on the crossbar. The forward movement of the entire device also aids in imparting a pulling to the machine as the fingers pass over the cam 29, so that the operator is not compelled to apply undue force in pushing forward the machine as the rotation of the chains 41 and the action of the fingers 55 actually aids in the forward movement of the machine. This feature is most important as the ease and facility of manipulating the apparatus within a cranberry bog is one of its most desirable advantages. The operator is not required to push the machine against the bushes to effect the berry-picking action as the latter results mainly from the upward pulling after the fingers 55 have passed the apex of the cam 29 and meanwhile having aided in exerting the forwardly feeding action of the entire machine in passing over said cam.

The operation of the apparatus will be readily understood. The operator pushes the machine forward with one hand on the steering handle 15 and the other on the cross bar 24 or on one of the side handles 17. A slight lifting of the handle 17 serves to raise the fingers 55 to desired height, either to clear the bushes or to secure the berry-picking action of the same at different levels, such action taking a toggle-like movement between the forward framework carried by the steering wheels 1 and the rearward portion carried by the wheels 2. Releasing the handle 17, it drops into the rest 21 and a substantially rigid sustaining framework is thus provided with the capability of the "knuckle joint" or "toggle action," above described. The rear wheels 2 operating through the sprockets act to drive the chains 41 feeding the cross bars 50 and the berry-picking fingers 55, around the triangular framework in the direction of the arrows, each set of fingers closing up on the next preceding set as they pass the apex of the cam 29, thus holding the berries until after passing over the rear sprocket wheels 40, whereupon the berries are automatically released and dropped into the open receptacle 25 in the middle of the framework. The frame 27 extends upwardly and rearwardly, as viewed in Fig. 1, a sufficient distance to catch the berries as they fall off the teeth 55 and guide them into the receptacle 25. If desired, the receptacle 25 may be removable and may thus be taken out when full of berries for ease in removing the same, the receptacle resting on the frames 26 and 27 as well as on the cross frames 56.

While our machine, as above described, is easily and readily operated by simply being pushed forwardly by the operator, we may also provide means to make the machine self-propelled. For this apparatus either a hand crank, or a motor driven crank may be applied to the driving mechanism such as the sprocket wheel 40 to rotate the same and thus move the berry-picking fingers directly and the driving wheels 2 secondarily. I have illustrated the hand crank 65 applied to the axle of the upper sprocket wheel 40 to which the handle 66 is secured. In this form the operator simply guides the apparatus with one hand on the steering handle 15, rotating the sprocket wheel 40, with the other hand on the crank handle 66. In this method of operation both the driving action of the berry-picking fingers 55 and that of the rear wheels 2 are simultaneously actuated, but in reverse order, as when the apparatus is driven by being pushed forwardly.

Additional features consist in the provision of a plurality of recesses 70 in the brace 31 in which a rod 71 may be fitted to hold the lever 16 when raised above the normal rest 21, so that the height of the berry-picking fingers 55 may be adjustably regulated and the provision of the cutting blades 60 at the outside of each set or row of the fingers 55. These blades are attached to the cross bars 50, near the ends thereof, in any convenient manner. This arrangement provides means which will cut the vines if entangled and also constitutes a side or closed member for the scooplike set of fingers 55 on each crossbar 50. Only a few of these blades 60 have been shown in the drawings, for the sake of clearness, although it will be understood that we may apply the same to each end of the crossbars 50 carrying the fingers 55, and also, if desired, apply the same intermediate the width of each crossbar to cut entangled bushes or vines.

Our invention is further described in the form of claim as follows:

A machine of the class described, having in combination, a movable framework, comprising triangular side members spaced apart with one side parallel to the path of movement of the framework, and the apex adjacent to the ground, sprocket wheels rotatably mounted on the framework at each side and at each end of the side parallel to the path of movement of the framework, a sprocket chain passing over each pair of wheels and over the apex on each side member, cross members connecting the chains and provided with a plurality of curved picking or gathering fingers rigidly connected in fixed angular relation to the cross members, said apex constituting a cam surface and providing for a sharp or quick change in the direction of movement of the sprocket chains and picking or gathering fingers, and means for rotating said sprocket wheels in the movement of the machine to cause a quick upward swing of the outer extremity of the picking or gathering fingers as they pass over the cam surface of the apex.

In testimony whereof, we have signed our names to this specification, in the presence of two subscribing witnesses.

AMBROSE TURNER.
HARRIE A. RIPLEY.

Witnesses:
JAMES R. HODDER,
RACHAEL G. LESLIE.